INVENTORS
EZRA E. THEYS
H B. MORSE R.B. JOHNSON
BY
ATTORNEYS

Nov. 16, 1971  E. E. THEYS ET AL  3,619,977
APPARATUS AND METHOD FOR HEAT SEALING CARTONS
Filed March 10, 1970  6 Sheets-Sheet 2

INVENTORS
EZRA E. THEYS
B. MORSE R.B. JOHNSON
BY
ATTORNEYS

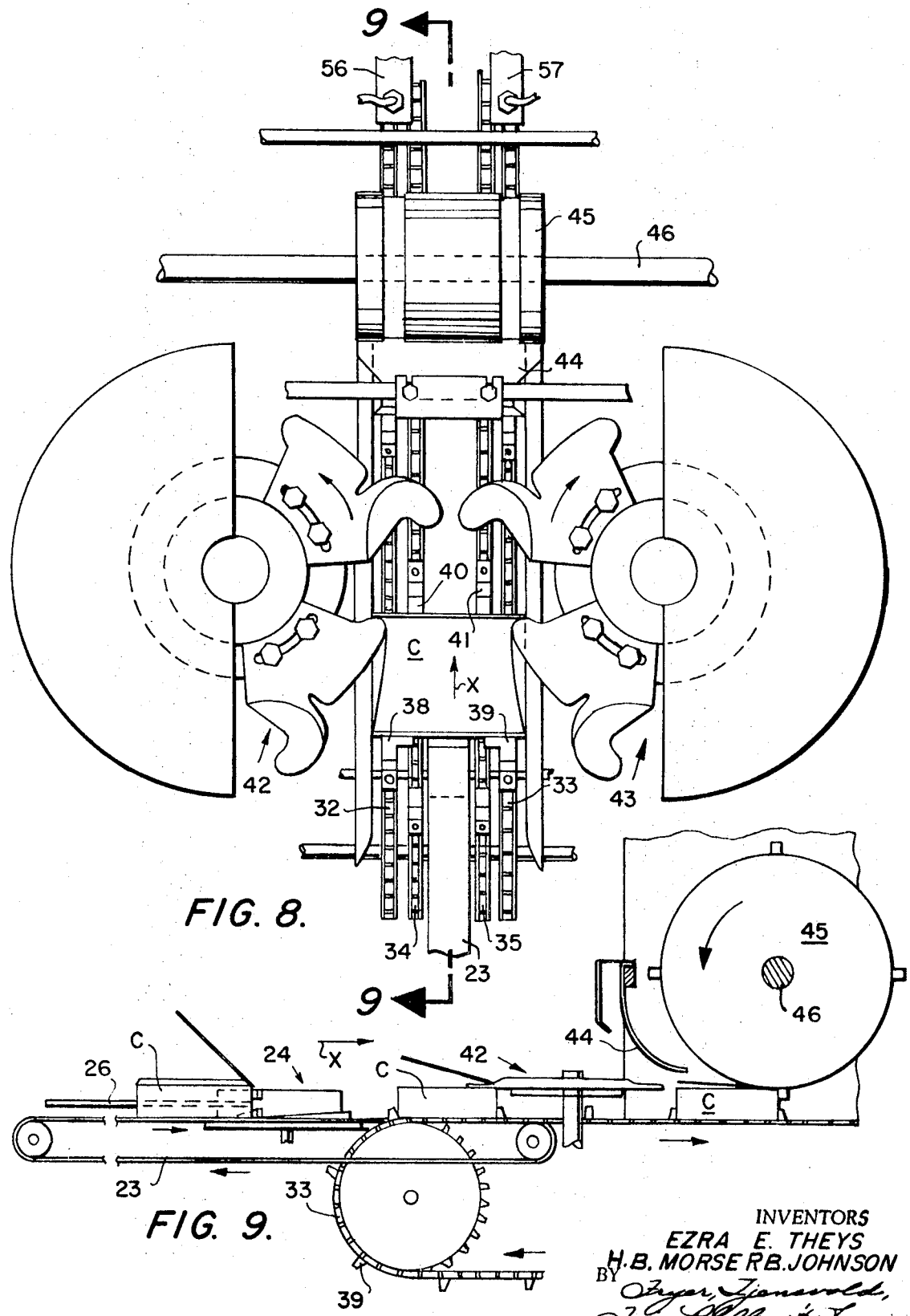

United States Patent Office 3,619,977
Patented Nov. 16, 1971

3,619,977
APPARATUS AND METHOD FOR HEAT
SEALING CARTONS
Ezra E. Theys, San Mateo, Hugh B. Morse, San Jose, and Robert B. Johnson, Santa Clara, Calif., assignors to Fibreboard Corporation, San Francisco, Calif.
Filed Mar. 10, 1970, Ser. No. 18,122
Int. Cl. B65h 7/20, 7/26
U.S. Cl. 53—376
22 Claims

ABSTRACT OF THE DISCLOSURE

An apparatus comprises carton feeding, folding and sealing stations for sequentially moving partially erected top-loaded frozen food cartons along a linear path, folding adhesively treated flaps thereof into superimposed relationship and for sealing the flaps together. The feeding station comprises horizontally disposed sorting wheels for precisely spacing and positioning the cartons onto a conveying means which moves the cartons through the folding station. The folded side flaps of the carton are then moved past first heat sealing means in the sealing station to subject the side flaps and adjacent side portions of a cover flap to heated air and to thereafter bond them together. The carton is then turned 90° to align a front flap and adjacent portions of the cover flap for bonding by a second heat sealing means.

CROSS-REFERENCE TO RELATED APPLICATION

The apparatus of this application relates to the type of apparatus disclosed in United States Patent application Ser. No. 799,783, by Ezra E. Theys et al. for "Apparatus and Method for Closing and Sealing Cartons," filed on Feb. 17, 1969 and assigned to the assignee of this application.

BACKGROUND OF THE INVENTION

This invention relates to the packaging arts and more particularly relates to the packaging of frozen foods by subjecting adhesively treated and folded carton flaps to heated air and final sealing pressures. Frozen food packaging companies are continuously seeking new apparatus and methods, primarly for the purpose of increasing packaging speeds to cope with ever increasing consumer requirements. Such increases in packaging speeds generally tend to give rise to leakage and contamination problems due to the inability of many apparatus to continually assure a tightly sealed carton. Packaging speed increases also tend to cause carton distortion and scarring to impair the carton's appearance and structural integrity.

SUMMARY AND OBJECTS OF THIS INVENTION

An object of this invention is to overcome the above, briefly described problems by providing an apparatus and method for expeditiously, efficiently and economically folding and sealing adhesively treated carton flaps together. The apparatus comprises a number of novel combinations and sub-combinations including a feeding station having rotary sorting means for precisely separating and spacing the cratons from each other prior to their delivery by a conveying means to a flap folding station.

After the carton flaps are suitably folded into position, they are moved past first heat sealing means to discharge a heated fluid onto opposed side flap portions of the carton and to seal them together. Another novel sub-combination of this invention comprises turning means, positioned in the sealing station, for turning the carton 90° to move opposed front flap portions of the carton past second heat sealing means to subject them to heated air. The front flap portions are then compressed and bonded together to form a tightly sealed carton.

Other objects of this invention will become apparent from the following description and accompanying drawings wherein:

FIG. 8 is an enlarged, top plan view of a carton flap folding station employed in the FIG. 1 apparatus;

FIG. 9 is a sectional view taken in the direction of arrows 9—9 in FIG. 8;

DESCRIPTION OF THE PREFERRED APPARATUS EMBODIMENT

Figure 1:
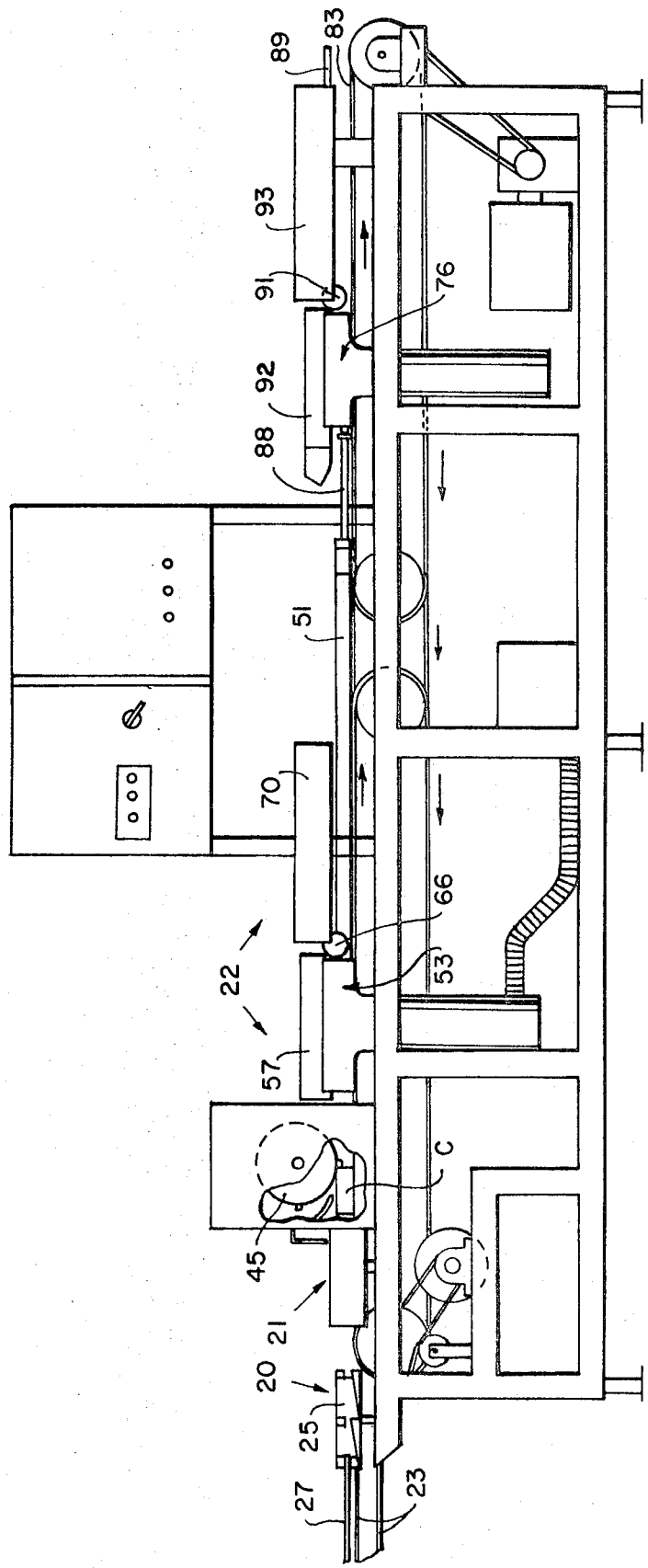
FIG. 1 is a side elevational view of an apparatus embodying novel features of this invention therein with parts broken-away and simplified for clarification purposes.
Figure 2:
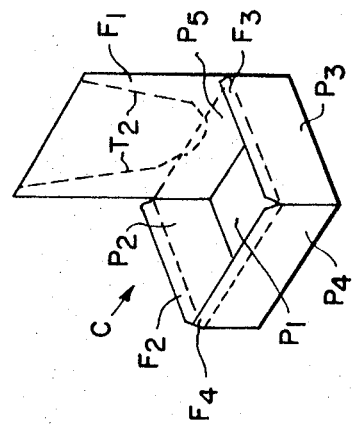
FIG. 2 is an isometric view of a partially erected carton adapted to have closure flaps folded and sealed pursuant to the teachings of this invention.
Figure 3:
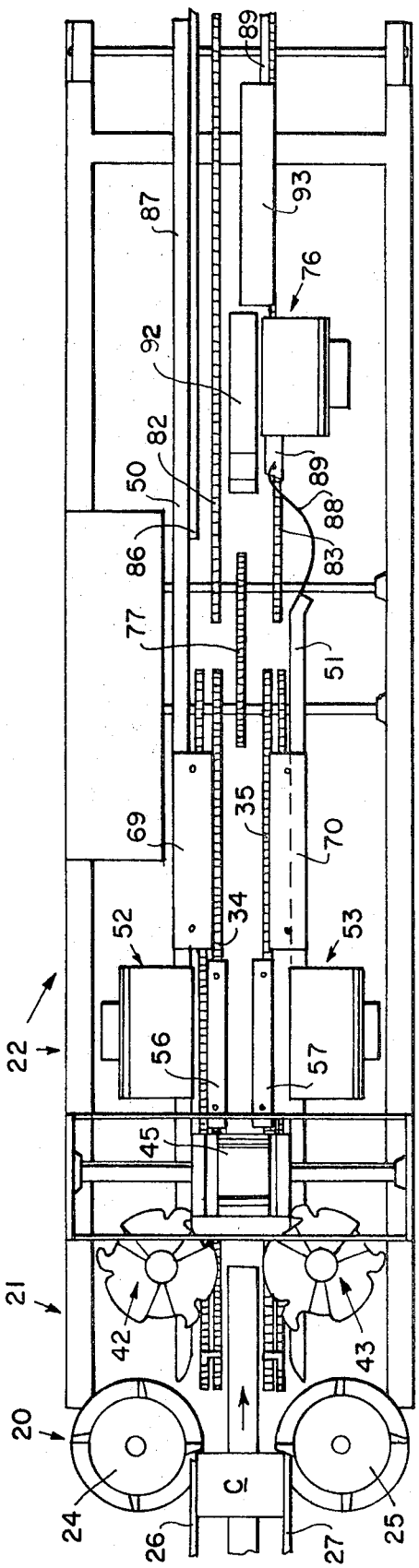
FIG. 3 is a top plan view of the FIG. 1 apparatus with parts broken away for clarification purposes.

The FIGS. 1 and 3 apparatus comprises a carton feeding or delivery station 20, a folding station 21 and a sealing station 22 all arranged in series to sequentially deliver, fold and seal the top-loaded type of carton C, illustrated in FIG. 2. The carton comprises a suitably cut and scored single blank partially erected to its FIG. 2 condition. The erected tray portion of the carton may be filled with a frozen food, such as brussel sprouts, prior to its delivery into the apparatus. The carton comprises a horizontally disposed bottom panel $P_1$ having vertically disposed side panels $P_2$ and $P_3$ and front and rear panels $P_4$ and $P_5$, respectively, hingedly connected thereto.

A top or cover flap or panel $F_1$ is hingedly connected at a scoreline to the top edge of rear panel $P_5$ whereas vertically disposed minor flaps $F_2$, $F_3$ and $F_4$ are connected in a similar manner to panels $P_2$, $P_3$ and $P_4$, respectively. A tearline $T_2$ may be formed in the top and rear panels to define a removable tab adapted to be torn open to expose the carton's contents after the cover flap has been bonded to minor flaps $F_2$–$F_4$ to form a closed carton.

The feeding or delivery station comprises a first conveying means shown in the form of an endless belt 23 suitably mounted in the apparatus to be driven by one of two spaced pulleys in a conventional manner (FIG. 8). The top surface coating of the belt preferably constitutes a serrated, rubber-like and highly frictional composition. Such coating will assure an adequate frictional engagement with bottom panel $P_1$ of the carton to propel it toward horizontally disposed rotary carton sorting and spacing means or wheels 24 and 25 (FIGS. 1 and 3).

The wheels are mounted for rotation about vertically disposed axes thereof to rotate in the direction of the linear movement of conveyor 23. The wheels are suitably integrated into the apparatus' overall drive system (not completely shown) to rotate in synchronized relationship. Stationary guide rail means 26 and 27 are disposed in parallel relationship with respect to the linear path or line of flight X of the cartons and conveyor 23 to prevent the cartons from moving laterally (FIG. 4).

Figure 4:
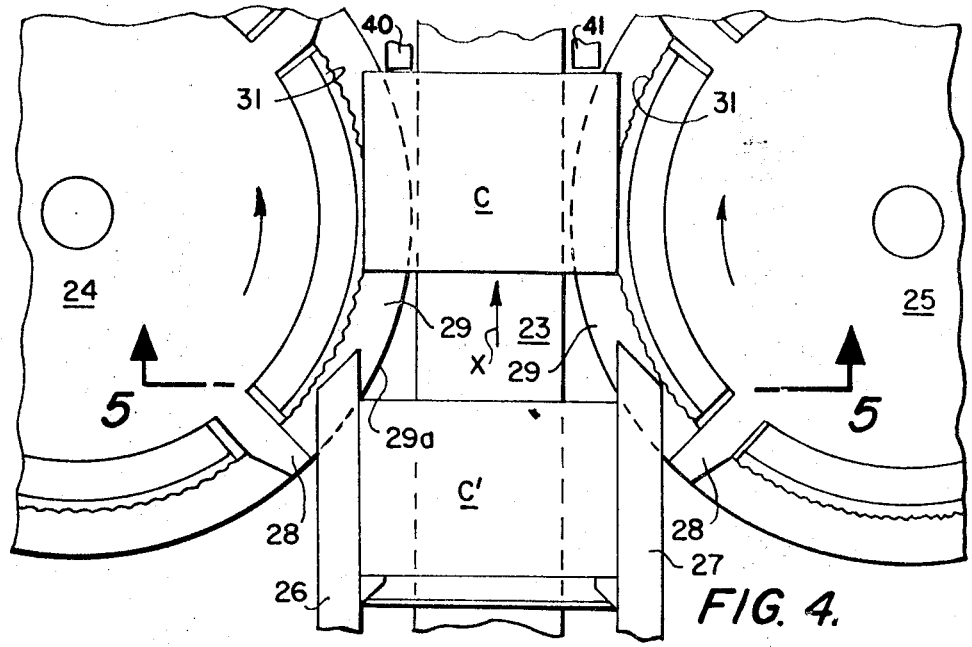
FIG. 4 is an enlarged, top plan view of a carton sorting means employed in a feeding station of the FIG. 1 apparatus.
Figure 5:
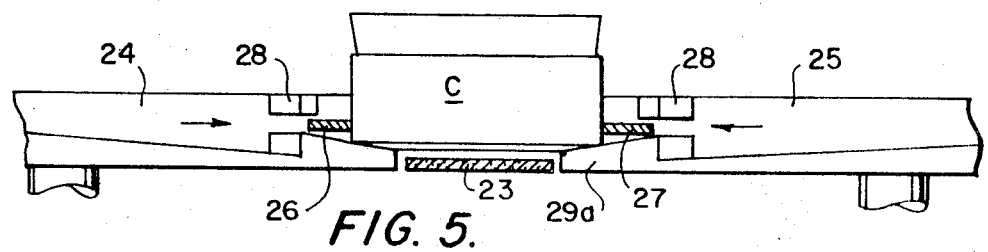
FIG. 5 is a sectional view of the carton sorting means taken in the direction of arrows 5—5 in FIG. 4.
Figure 6:
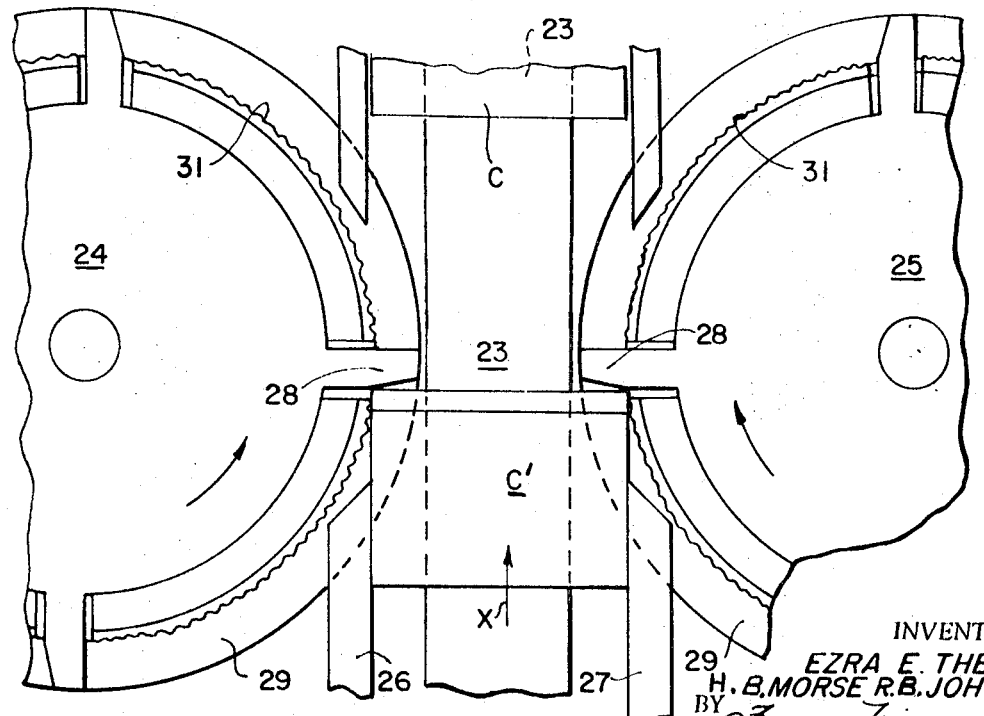
FIG. 6 is a view similar to FIG. 4, but disclosing the carton sorting means in an advanced mode of operation.

Referring to FIGS. 4–7, each wheel comprises a plurality of radially projecting lugs 28 mounted on the periphery thereof. The wheel further comprises a plurality of connecting ramp portions 29 with each ramp portion positioned between each pair of adjacent lugs for permitting the trailing portion of a leading carton C to gradually rise thereon and out of engagement with belt 23 (FIGS. 4 and 5). The front portion of the carton preferably remains in contact with belt 23 during the carton separation and spacing step.

Figure 7:
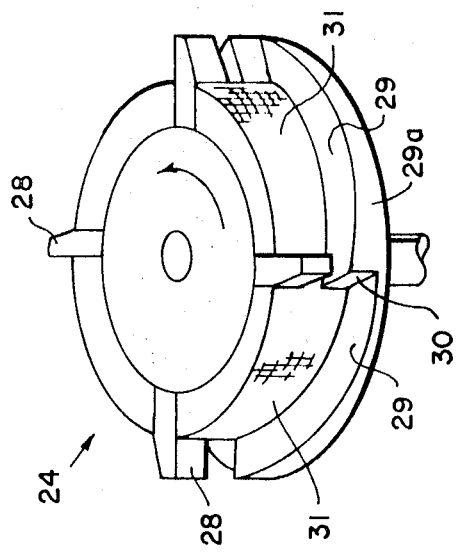
FIG. 7 is an enlarged isometric view of a sorting wheel employed in the carton sorting means.

The adjacent, trailing carton C' is held back and thus separated from the leading carton by its engagement with vertically disposed outer surface 29a of the wheel (FIG. 4). It should be noted that each ramp gradually increases in vertical height from a leading lug to an adjacent trailing lug and terminates at a vertically disposed separating surface portion 30 (FIG. 7). Upon rotation of the wheels from their FIG. 4 to FIG. 5 position, the leading corners of trailing carton C' abut indexing means, comprising lugs 28 and surface portions 30.

The linear speed of belt 23 is preferably slightly greater (e.g. 5%) than the surface speed of vertically disposed surface portions 31 of the wheel to "crowd" carton C' against the indexing means. Each surface portion 31 is disposed between each pair of adjacent ramp portions 29 and preferably coated with a highly frictional coating, such as a serrated, rubber-like composition similar to that used on belt 23. Opposed surface portions 31 of wheels 24 and 25 frictionally engage and hold side panels $P_2$ and $P_3$ of the carton therebetween to positively convey the carton toward the folding station.

When the carton is released by the wheels (FIG. 6), belt 23 continues to move the evenly spaced cartons toward a second conveying means comprising pairs of endless chains 32–33 and 34–35 (FIGS. 8 and 9). The carton is received between lugs 38–39, attached to endless chains 32–33, respectively, and lugs 40–41, attached to endless chains 34–35, respectively. Lugs 38–39 abut trailing panel $P_4$ whereas lugs 40–41 abut leading panel $P_5$ to capture the carton therebetween.

The carton is then moved through folding station 21 to fold flaps $F_1$–$F_4$ into superimposed relationship. The folding of minor flaps $F_2$–$F_4$ is effected by horizontally disposed folding assemblies or tucker means 42 and 43 mounted on opposite sides of the second conveying means. These folding assemblies and their functions are fully disclosed in above-referenced U.S. Patent application Ser. No. 799,783. After the three minor flaps are folded, a stationary plow means 44 contacts and folds top panel or cover flap $F_1$ to superimpose it over the minor flaps. A cylinder 45 may be suitably mounted for rotation on a horizontally disposed drive axial 46 (FIG. 8) to roll against panel $P_1$ to firmly pack the product (not shown) in the carton.

Figure 10:
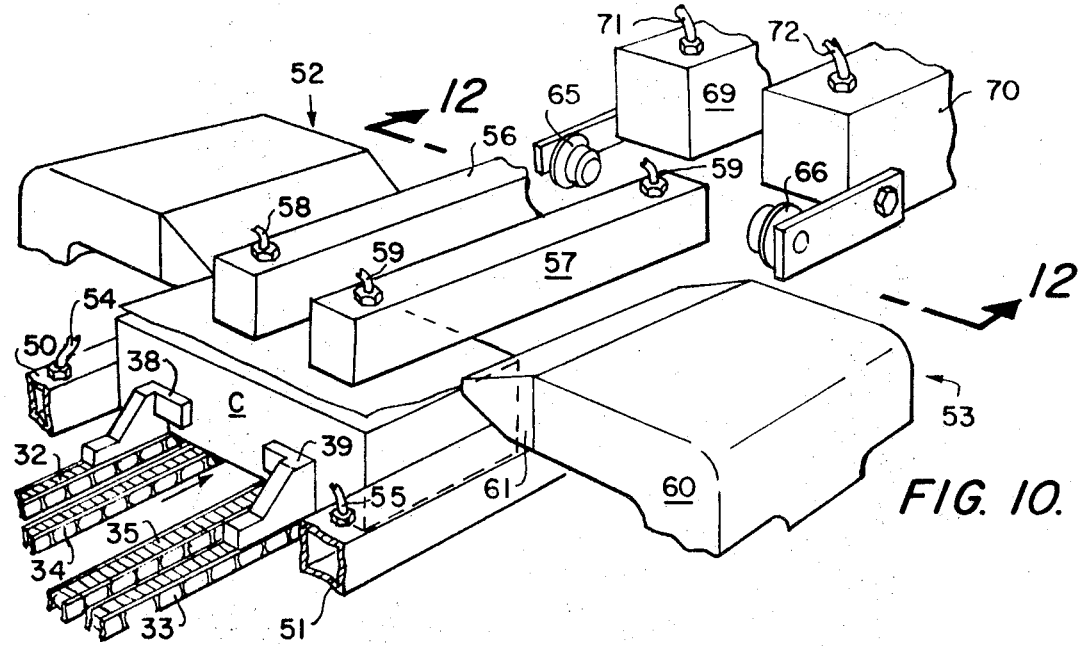
FIG. 10 is an enlarged and partially sectioned isometric view of first carton flap heat sealing means employed in a sealing station of the FIG. 1 apparatus with parts removed for clarification purposes.
Figure 11:
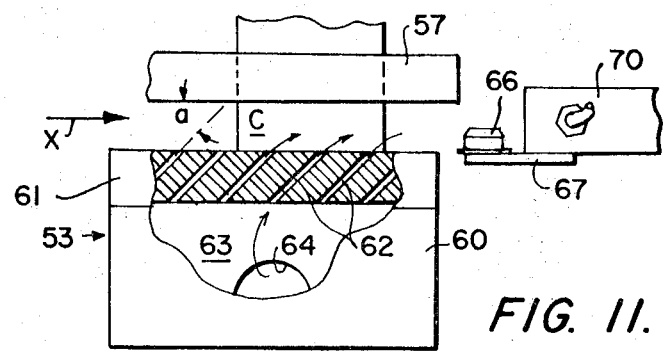
FIG. 11 is a partially sectioned, top plan view of a heater and roller employed in the heat sealing means of FIG. 10.
Figure 12:
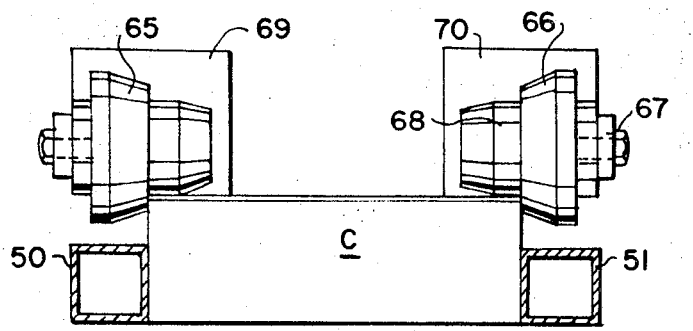
FIG. 12 is an enlarged sectional view taken in the direction of arrows 12—12 in FIG. 10.

Referring to FIGS. 10–12, the second conveying means moves the carton along line of flight X and into sealing station 22 to initiate the bonding of flaps $F_1$–$F_4$ together. Stationary and hollow guide bars 50 and 51 are positioned on opposite sides of the carton to maintain it in correct position prior to its passage past a first heat sealing means comprising opposed heaters 52 and 53. Inlet and outlet conduits, such as conduits 54 and 55, may be suitably connected to the guide bars to communicate and circulate a coolant, such as cooled water, therethrough to aid in the dissipation of heat.

Overhead, hollow hold-down bars 56 and 57 are mounted in a stationary manner in the apparatus to abut and hold flap $F_1$ in its correct position over flaps $F_2$–$F_4$. Conduits, such as illustrated conduits 58 and 59, may be suitably arranged to circulate a coolant through the hold-down bars. As shown in FIG. 10, flap $F_1$ is held in slightly spaced relationship, due to its inherent resiliency, with respect to flaps $F_2$ and $F_3$. Thus the sealing means may readily discharge a heated fluid, such as heated air, onto critical sealing portions thereof.

The heaters are identical with each heater comprising a hollow housing 60 terminating in a tapered nozzle means or head 61 at a forward end thereof. The nozzle means is parallel to carton line of flight X (FIG. 11) and has a plurality of suitably sized nozzles 62 formed therethrough. The nozzles discharge heated air, received from chamber 63 and inlet 64, onto opposed, adhesively treated surface portions of flaps $F_1$ and $F_3$.

The nozzles are preferably disposed at an acute angle $a$, relative to carton line of flight X, which is preferably selected from the range of from 25° to 75° depending on the particular flap orientation and carton to be sealed. Such disposition of the nozzles assures an evenly and efficiently distributed discharge of heated air onto the critical sealing portions of the carton flaps. In particular, an adequate quantity of heated air is discharged adjacent to the corner whereat flaps $F_1$ and $F_3$ intersect which constitutes one of the critical and leakprone areas to be sealed.

After the adhesive is activated on the sealing portions of flaps $F_1$, $F_2$ and $F_3$, a pair of identical rollers 65 and 66 of the first heat sealing means are mounted downstream of the heaters to compress and bond such flap portions together. Roller 66, for example, is rotatably mounted on a stationary bracket 67 and comprises a cylindrical portion 68 which effects the compression function. The sealed portions of the flaps then move under hollow hold-down bars 69 and 70 to assure a complete bond. Conduits, such as illustrated conduits 71 and 72, may be suitably attached to the bars to constantly circulate a coolant therethrough.

Figure 14:
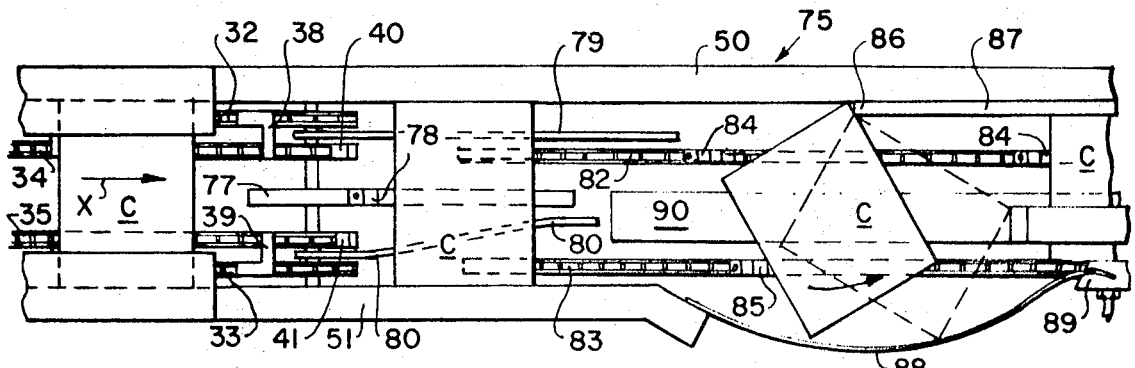
FIGS. 13 and 14 are perspective and top plan views, respectively, of a carton turning means employed in the sealing station of the FIG. 1 apparatus with parts removed for clarification purposes.
Figure 15:
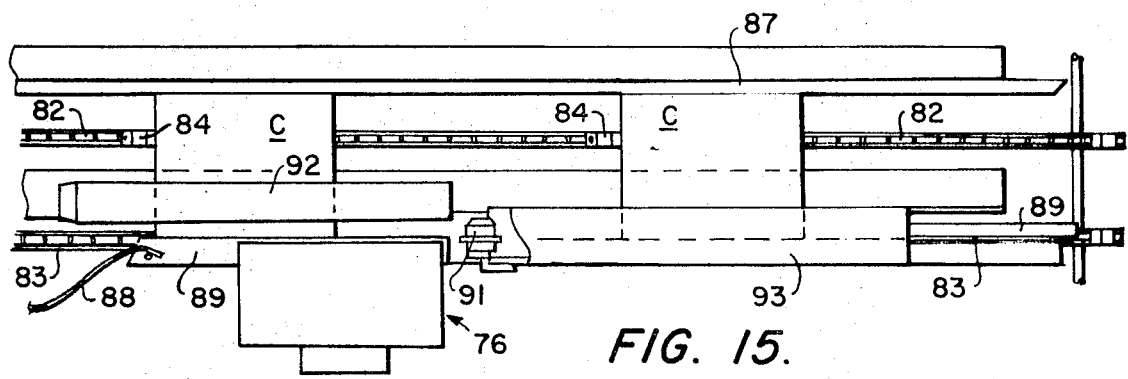
FIG. 15 is a top plan view of a second carton flap heat sealing means employed in the sealing station of the FIG. 1 apparatus.
Figure 13:
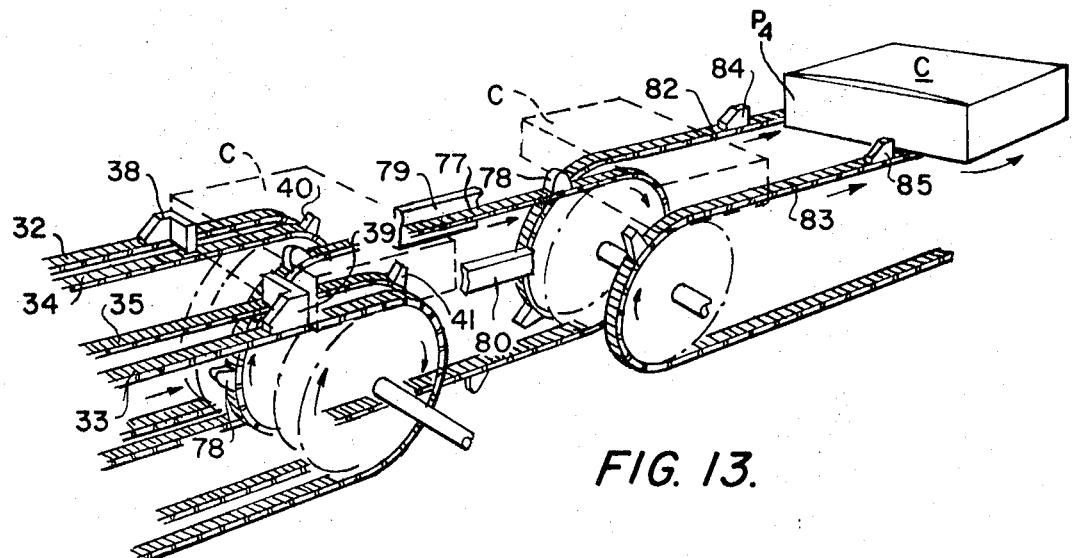

Referring to FIGS. 13–15, a carton turning means 75 is employed in the sealing station, between first heaters 52 and 53 and a third identical heater 76 of a second heat sealing means (FIG. 15). Such turning means functions to turn the carton counterclockwise 90° relative to line of flight X to align minor flap $F_4$ and the front edge of cover panel or flap $F_1$ with the second sealing means for final sealing purposes. The turning means comprises a third conveying means or endless chain 77 having a plurality of suitably spaced lugs 78 attached thereto. The third conveying means is arranged for receiving and moving the cartons along line of flight X.

A trailing lug 78 will engage the trailing or front panel $P_4$ of the carton to move it on stationary rails 79 and 80. Laterally spaced stationary guide bars 50 and 51 will function to prevent the carton from moving laterally (FIG. 14). A fourth conveying means, comprising endless chains 82 and 83, having lugs 84 and 85, respectively, suitably attached thereto, then functions to receive the cartons from chain 77.

It should be noted in FIG. 14 that lugs 84 and 85 are offset laterally so that the carton will first be engaged by lug 85 to pivot the carton about a leading first corner thereof by engagement with a stationary pivot means comprising an end 86 of a stationary guide bar 87. A curved stationary guide means or member 88, attached to bar 51 and a guide bar 89 disposed parallel to guide bar 87, cooperates with opposed end 86 and lug 85 to smoothly guide the pivotal movements of the carton. In particular, the curved guide means will positively guide a second corner of the carton which is diametrically opposed to the above-mentioned first corner.

Once the carton is turned 90° to its FIG. 15 position, lug 85 disengages the carton. The carton preferably has a width which is less than its length so that lug 84 will solely engage the carton to move it past heater 76. A horizontally disposed stationary support plate 90 is mounted below the carton in the carton turning means to support it during its pivotal movements.

After the nozzle means of heater 76 has subjected flap $F_4$ and juxtposed portions of flap $F_1$ to heated air, a roller 91 of the second heat sealing means, identical to rollers 65 and 66, compresses the flap portions together to effect final sealing thereof. A water-cooled hold-down bar 92 (FIG. 3) is positioned above the carton to hold the flaps $F_1$ and $F_4$ in suitably spaced relationship during the sealing function. A water-cooled compression bar 93 is positioned downstream of roller 91 to aid in applying a final sealing pressure to the flaps and to also provide a suitable heat sink thereat. Laterally spaced stationary bars 87 and 89 are suitably positioned to prevent lateral movements of the carton during final sealing.

It should be understood that the various conveying means, carton feed, folding wheels and other movable parts are suitably integrated into the main drive system of the apparatus to be moved at their desired relative speeds. In addition, the various collant receiving bars 50, 51, 56, 57, 69, 70, 89, 92 and 93 may be suitably connected to a cooled water and pumping source (not shown) in a conventional manner.

What is claimed is:

1. An apparatus comprising feeding, folding and sealing stations for forming a sealed carton, said feeding station comprising conveying means for moving a plurality of cartons along a linear path and rotary carton sorting means for separating and precisely spacing said cartons from each other along said path prior to their delivery to said folding station, said folding station comprising two horizontally disposed tucker means mounted for rotation adjacent to and on opposite sides of said conveying means for engaging and folding three carton flaps into substantially horizontal positions.

2. The invention of claim 1 wherein said feeding station further comprises stationary guide rail means mounted adjacent to said conveying means and disposed in parallel relationship with respect to said path to prevent said cartons from moving laterally.

3. The invention of claim 1 wherein said conveying means comprises an endless belt having a highly frictional surface thereon for engaging bottom panels of said cartons.

4. The invention of claim 1 wherein said rotary carton sorting means comprises a horizontally disposed rotary wheel rotatably mounted about a vertically disposed axis thereof on each side of said path to rotate in the direction of said conveying means.

5. The invention of claim 4 wherein each wheel comprises a plurality of indexing means radially disposed thereon, relative to said axis, for engaging leading corners of said cartons.

6. The invention of claim 5 wherein each wheel further comprises a ramp portion positioned between each pair of adjacent indexing means, said ramp portion gradually increasing in vertical height from a leading indexing means to an adjacent trailing indexing means.

7. The invention of claim 6 further comprising a vertically disposed frictional surface portion on the periphery of each wheel disposed adjacent to each of said ramp portions.

8. The invention of claim 1 further comprising a second conveying means for receiving said cartons from said first-mentioned conveying means and for moving them along said linear path.

9. The invention of claim 1 wherein said folding station further comprises a stationary plow means mounted adjacent to and vertically above said conveying means for folding and superimposing a cover flap over said other flaps.

10. The invention of claim 1 wherein said folding station further comprises a cylinder mounted for rotation vertically above said second conveying means for rolling against a cover flap of said carton.

11. The invention of claim 1 wherein said sealing station comprises at least one first heat sealing means, including a stationary nozzle means disposed in substantial parallel relationship with respect to the linear path of said carton for discharging a heated fluid onto adhesively treated flaps of said carton.

12. The invention of claim 11 wherein said nozzle means comprises a plurality of nozzles extending toward said linear path and disposed at an acute angle relative thereto selected from the range of from 25° to 75°.

13. The invention of claim 11 wherein one of said nozzle means is positioned on each side of said linear path.

14. The invention of claim 11 wherein said first heat sealing means further comprises roller means rotatably mounted adjacent to said nozzle means and downstream thereof along said linear path for compressing said carton flaps to bond them together.

15. The invention of claim 1 wherein said sealing station comprises carton turning means for turning each carton 90° relative to said linear path.

16. The invention of claim 17 wherein said carton turning means comprises another conveying means for receiving said cartons and for moving a leading first corner of each carton into engagement with a stationary pivot means.

17. The invention of claim 16 wherein said carton turning means further comprises a curved stationary guide means for guiding a second corner of said carton which is diametrically opposed to said first corner.

18. The invention of claim 16 wherein said sealing station further comprises a further conveying means for receiving said carton from another conveying means and heat sealing means positioned adjacent to said further conveying means for discharging a heated fluid onto at least one adhesively treated carton flap which is turned by said turning means 90° relative to said linear path and for bonding said flap to another flap.

19. The invention of claim 11 wherein said sealing station further comprises a second heat sealing means, including a stationary nozzle means located downstream of said first heat sealing means along said linear path, for discharging a heated fluid onto other adhesively treated flaps of said carton.

20. The invention of claim 19 wherein said second heat sealing means further comprises roller means for compressing said other adhesively treated flaps together.

21. An apparatus comprising feeding, folding and sealing stations for forming a sealed carton, said feeding station comprising conveying means for moving a plurality of cartons along a linear path and rotary carton sorting means for separating and precisely spacing said cartons from each other along said path prior to their delivery to said folding station, said rotary carton sorting means comprising a horizontally disposed rotary wheel rotatably mounted about a vertically disposed axis thereof on each side of said path to rotate in the direction of said conveying means, each wheel comprising a plurality of indexing means radially disposed thereon, relative to said axis, for engaging leading corners of said cartons and a ramp portion positioned between each pair of adjacent indexing means, said ramp portion gradually increasing in vertical height from a leading indexing means to an adjacent trailing indexing means.

22. An apparatus comprising feeding, folding and sealing stations for forming a sealed carton, said feeding station comprising conveying means for moving a plurality of cartons along a linear path and rotary carton sorting means for separating and precisely spacing said cartons from each other along said path prior to their delivery to said folding station, said sealing station comprising carton turning means for turning each carton 90° relative to said linear path, said carton turning means comprising a second conveying means for receiving said cartons from said first-mentioned conveying means and for moving a leading first corner of each carton into engagement with a stationary pivot means, third conveying means for receiving said carton from said second conveying means and heat sealing means positioned adjacent to said third conveying means for discharging a heated fluid onto at least one adhesively treated carton flap which is turned by said turning means 90° relative to said linear path and for bonding said flap to another flap.

References Cited

UNITED STATES PATENTS

| | | | |
|---|---|---|---|
| 3,352,403 | 11/1967 | Blake | 198—34 |
| 2,907,443 | 10/1959 | Del Rosso | 198—34 |
| 2,993,319 | 7/1961 | Gaubert | 53—377 X |
| 3,416,411 | 12/1968 | Hittenberger et al. | 53—375 X |
| 2,805,753 | 10/1957 | Palmer | 198—33 AB |
| 3,389,645 | 6/1968 | Winters et al. | 53—375 X |
| 3,307,329 | 3/1967 | Lefief | 53—376 |

TRAVIS S. McGEHEE, Primary Examiner

U.S. Cl. X.R.

53—375; 198—33 AB, 34